United States Patent [19]
Eagen et al.

[11] Patent Number: 5,461,716
[45] Date of Patent: Oct. 24, 1995

[54] METHOD AND APPARATUS FOR ASSISTING IN THE PRESENTATION AND REMOVAL OF WINDOWS

[75] Inventors: Stephen T. Eagen; Harvey G. Kiel, both of Rochester; Nelson A. Martel, Jr., Stewartville; William C. Rapp; Schuman M. Shao, both of Rochester, all of Minn.

[73] Assignee: International Business Machines Corporation, Armonk, N.Y.

[21] Appl. No.: 421,139

[22] Filed: Apr. 13, 1995

Related U.S. Application Data

[63] Continuation of Ser. No. 863,155, Apr. 2, 1992, abandoned, which is a continuation of Ser. No. 527,010, May 22, 1990, abandoned.

[51] Int. Cl.$^6$ ..................................................... G06T 1/00
[52] U.S. Cl. .................... 395/157; 395/158; 395/155; 395/162; 395/163; 395/166; 395/133; 395/135
[58] Field of Search .................................. 395/155–158, 395/162–166, 133–135

[56] References Cited

U.S. PATENT DOCUMENTS

| | | | |
|---|---|---|---|
| 4,550,386 | 10/1985 | Machida et al. | 395/275 |
| 4,651,146 | 3/1987 | Lucash et al. | 340/750 X |
| 4,811,284 | 3/1989 | Adler et al. | 395/250 |
| 4,860,247 | 8/1989 | Uchida et al. | 395/153 |
| 4,864,532 | 9/1989 | Reeve et al. | 395/250 |
| 4,924,410 | 5/1990 | Hamada | 345/1 |
| 4,965,559 | 10/1990 | Dye | 340/717 |
| 5,062,060 | 10/1991 | Kolnick | 395/157 X |

FOREIGN PATENT DOCUMENTS 0309676  7/1988  European Pat. Off. .

Primary Examiner—Almis R. Jankus
Attorney, Agent, or Firm—Paul L. Sjoquist; Owen J. Gamon

[57] ABSTRACT

A method and apparatus for incorporating windowing techniques into computer systems having a host processor executing applications programs, and interconnected through a plurality of controllers to a number of non-programmable and programmable terminals, by distributing the processing steps required for windowing between the host processor and the controllers; the host processor generates a data stream defining the window parameters, the data stream is receivable by controllers for either programmable or non-programmable terminals, each controller being adapted to construct and display the window on the display screen(s) which it controls.

9 Claims, 10 Drawing Sheets

```
                    Budget Report Options

Select report type, fiscal period, and one or more budget accounts.

Report Type .........  1   1. Spread by month
                               2. Spread by account
                               3. Transactions listing
                               4. Year-end projections Fiscal Period .........     x          (F4=List)

Budget Accounts ......  _Cable TV    _Groceries    1Stocks
                            _Car         _House        _Taxes
                            _Charities   _Insurance    _Utilities
                            1Clothes     _Interest     _Wages
                            _Gifts       _Recreation

ENTER    F1=HELP    F3=EXIT    F12=CANCEL
```

FIG. 10A

Budget Report Options

Select report type, fiscal period, and one or more budget accounts.

Report Type .......... ⊥  1. Spread by month
                          2. Spread by account
                          3. Transactions listing
                          4. Year-end projections Fiscal Period ........  x_____

```
                                    Fiscal Period

_1. Month
                                     2. Quarter
                                     3. Year
Budget Accounts ......  _Cable TV                          ks
                        _Car          ENTER  F12=CANCEL    s
                        _Charities                         ties
                        ¹Clothes      _Interest    _Wages
                        _Gifts        _Recreation
```

ENTER    F1=HELP    F3=EXIT    F12=CANCEL

FIG. 10B

METHOD AND APPARATUS FOR ASSISTING IN THE PRESENTATION AND REMOVAL OF WINDOWS

This is a continuation of application Ser. No. 07/863,155, filed Apr. 2, 1992, now abandoned which is a continuation of application Ser. No. 07/527,010, filed May 22, 1990, now abandoned.

BACKGROUND OF THE INVENTION

The present invention relates generally to computer workstations which are connected for information interchange with host or mainframe computer systems; more particularly, the invention relates to a method and apparatus for generating and removing "windows" on certain computer workstations in order to provide a consistent user interaction between workstation types. Further, the invention relates to a method and apparatus which significantly improves overall response time for the presentation and removal of windows in systems wherein a host processor executes applications programs and is connected to a plurality of remote terminals.

Historically, operator interface with a mainframe computer system evolved from a single operator control console which was attached to the mainframe structure. The operator control console amounted to little more than a keyboard for enabling the operator generation of simple input commands, and a display screen for enabling the mainframe computer to present simple status messages to the operator. The evolution and expansion of this concept led to the development of multiple, limited-intelligence terminals, to enable a number of users to communicate with a mainframe system, wherein the multiple terminals were perhaps remotely positioned from one another, and from the mainframe system, but commonly connected to a controller, and the controller was connected to the mainframe computer system. However, the multiple terminal concept was a relatively low cost solution to enable multiple users to communicate with a mainframe computer system, but with limited intelligence contained within each terminal, so that the user communication was restricted to relatively simple input/output transfers.

The development of the stand-alone personal computer (PC) provided a high level of internal intelligence to enable a great many user interface functions to be added to the PC, with the result that the PC became a very "user friendly" device. Among the interface enhancements which were made possible by the PC development were enhanced cursor controls, scrolling, and "windows." These enhancements greatly improve the computer's communication with a user.

The user friendly PC soon became adapted for communication with host computer systems, initially by connecting the PC to a controller, and by writing software to enable the PC to emulate a terminal with limited intelligence, normally connectable to the controller. Eventually the PC/mainframe interface was developed to enable a PC to communicate more or less directly with a host processor, wherein the independent intelligence contained within a PC could be used both to enhance the user interface with the host system and to independently execute software apart from the host system. A class of terminals evolved utilizing these concepts, which became known as "intelligent" terminals, and the previously evolved, limited-intelligence terminals became known as "dumb" terminals. By virtue of the widely varying internal intelligence of these two types of terminals, the capabilities and rules for using the terminals also became widely varied.

A great deal of effort has been spent in attempting to develop a set of rules for common usage of computer workstations, even though the hardware designs of such workstations may be widely varied. The basis for this effort is to simplify the rules for users of these workstations, thereby reducing the amount of time required by a user in understanding the interaction with the workstation. A further basis is to allow a common programming interface to drive presentation management functions independent of workstation device types. In an idealized situation, the rules for user access and interaction would be identical for all workstations, regardless of the level of hardware design sophistication of any particular workstation. However, the idealized situation is difficult to achieve, because of the differences in hardware design sophistication between and among workstations. The so-called "intelligent" class of workstation inherently includes a hardware design which is capable of a full range of independent computer operations; the so-called "dumb" workstation typically includes only enough hardware design to enable operator interaction through a keyboard and display screen for communicating simple information and commands. For example, International Business Machines (IBM) has classified the universe of "intelligent" workstations under the heading of "independent workstations" or programmable workstations (PWS), and the second category under the designation of "dependent workstations"(DWS), or non-programmable terminals (NPT). The PWS is inherently capable of performing a relatively high level of independent computer operations, whereas the DWS is essentially capable of merely receiving command and control information from a host computer, displaying it, and transferring operator keystroke data back to the host computer via a controller. Naturally, the cost of a PWS is significantly higher than a DWS, although for a great number of computer applications the limited sophistication of a DWS is adequate for the task at hand. It is not unusual for a computer purchaser to initially utilize one or more DWS devices connected to a host computer, and then later replace these devices with PWS devices. It is also not unusual to have both DWS and PWS devices connected to the same host computer system.

A PWS is typically a complete computer processing system, and may have a built-in media device such as a diskette or hard disk. A PWS can therefore run stand-alone processing applications in the workstation, and can communicate independently with a host computer system through standard communications connections. In contrast, a DWS is connected to a host processing system through a workstation controller (WSC), and in a typical system arrangement a single WSC is connected to and supports a considerable number of DWS terminals. The WSC communicates with the host processor through local bus or remote communications connections, but each DWS is attached to the WSC via a communications cable. The DWS can operate only on host-based computer processing applications, and has only a limited internal capability to provide enhanced user interface functions. Whereas a PWS typically has 1–16 or more megabytes of internal memory, the DWS internal memory is minimal. The PWS can always store at least the data required for assembling or constructing one or more screen display images in its internal memory, whereas the DWS can only store the data to refresh the screen image currently being displayed, and therefore each time the display screen is changed in a DWS the change must be initiated by the host processor.

In any typical prior art system utilizing a host processor and workstations, wherein the workstations are utilized for user interaction and access and the host processor is utilized for running applications programs, the host processor provides certain fundamental information. For example, the host processor may generate a data stream containing information to be displayed on a workstation screen, and information for controlling the presentation and position of the data on the screen. The data stream generally does not convey any logical intelligence, i.e. information to enable the workstation to independently control and manipulate subsequent screen display panels as a consequence of its interfacing with the user. The control and manipulation of each screen display panel is typically generated by the host processor, by transmitting a new data stream for each panel, wherein each data stream contains new presentation and position information. In the case of a PWS, the host processor data stream is sent directly to the workstation and is processed internally in the workstation, which itself contains sufficient internal memory and program data to directly control the interaction with the display screen and keyboard. In the case of the DWS, the host processor data stream is sent to a workstation controller (WSC), and the WSC provides the internal memory and control for directly controlling the display screen of the DWS. The workstation controller may poll the workstation to determine whether a keystroke should be recognized or whether any of a predetermined number of commands have been accepted. This results in a more limited set of options available to the user of a DWS, than is available to the user of a PWS.

It would be a distinct advantage to the users if the DWS and PWS terminals could be operated under the same set of user interaction rules, and manufacturers strive continuously for this result. For example, IBM has defined a "common user access"(CUA) for use with IBM's Systems Application Architecture (SAA), which has been published in IBM Publication No. SC26-4583-0 under the title "Common User Access Basic Interface Design Guide," and in IBM Publication No. SC26-4582 under the title "Common User Access Advanced Interface Design Guide." These publications set forth a set of common user access specifications to attempt to achieve consistency among the various types of workstation designs. However, the specifications distinguish, in a number of important respects, the rules for user access to PWS terminals versus DWS terminals. It would be an advantage if the number of instances of differences between such terminals could be reduced or even eliminated, to enable users to have the same understanding regarding access to a system, regardless of the degree of design sophistication of the user's workstation. The foregoing publications distinguish PWS terminals as "programmable workstations" and DWS terminals as "nonprogrammable terminals." A nonprogrammable terminal is defined as a terminal attached to a host processor via a workstation controller, in which all or most of the user interface functions are controlled by the host.

The user interaction with a terminal, and therefore with the host computer, is accomplished via a user-operated keyboard and a display screen. The user interacts with the display screen by means of a cursor to provide a focal point for user interaction with the panel. In some cases, user interaction is accomplished at least in part via a "mouse" device, which enables the user to interact with display panels and to convey signals to the host processor for generating new and/or modified display panels.

Among the enhancements which have been made available for improving user interaction in recent years is a concept which has become known as "windowing," which allows the presentation of display panels in overlapping relationship on a display screen. The concept enables a user to retain a display panel on the screen, while temporarily superimposing a further display panel entirely or partially over the retained panel. This enables the user to divert his attention from a first display panel to one or more secondary display panels for assistance and/or reference, so that overall user interaction may be improved. The processor which controls this operation must retain the information relating to the original display panel and any subsequent overlaid windows, including the particular display panel conventions associated with each, and must also control the processing operations commanded by the user during his interactive use of each of the windows. Windowing activities impose significant processing loads, and also require reasonably short response times in order to be effective.

In a computer system having a host processor executing applications programs, and which includes a significant number of remote terminals, the processor loading of enhancements such as windows presents a serious problem, for all of the processing operations must be performed within the host processor and transmitted to the terminals in real time, without perceptible delays which could inhibit user efficiency. As the number of terminals which are connected to a host processor increases, the problem becomes more serious, and in practical terms it imposes such processing loads on the host processor as to make the windows enhancement unusable with systems of this type. Therefore, without an adequate solution to this problem, the "common user access"(CUA), which defines a set of interaction rules intended to be adopted for all terminals, cannot be implemented. It is extremely desirable that a solution to this problem be found, in order that the common user access rules can indeed be applied to all terminals. The present invention addresses this problem, and provides a solution which enables the common user access rules to be applied to DWS terminals as well as to PWS terminals.

Although a PWS terminal is of considerably more sophisticated design than a DWS terminal, when it is used in an environment where a host processor executes applications programs and merely utilizes the PWS terminal for operator/user interface, the PWS terminal suffers from most of the same limitations as a DWS terminal. For example, each time a display panel is changed on the screen of either type of terminal, the host processor creates the panel description, and presentation, and constructs a data stream for transmission to the terminal. A typical data stream transmission may include 2,000 bytes of information, more or less, and may require a transmission time of at least several seconds, in addition to the processing time required for creating and developing the data stream. In a system involving a considerable number of such terminals, the processing load and transmission time constraints are cumulative, leading to significant reduction in overall system performance. The present invention deals with a method for improving that performance with respect to both PWS terminals and DWS terminals. However, for convenience herein, reference will be made to DWS terminals throughout, it being understood that the uses and advantages of the invention are equally applicable to both types of terminals. Where reference is made herein to workstation controllers (WSC), it should be understood that such controllers are associated with DWS terminals, and PWS terminals do not utilize workstation controllers. PWS terminals communicate directly with the host processor through suitable I/O communications controls, but PWS devices have internal logic which effectively performs the same functions as are performed by workstation controllers.

Summary of the Invention

The present invention provides a method and apparatus for allowing host processor application software to run in a window environment in a system utilizing a plurality of DWS terminals. The invention enables the common user access rules to be fully adopted with respect to DWS terminals. The method is performed in a series of interactive steps between a host processor and workstation controller (WSC), wherein certain initial steps are performed within a host processor to define the content of a window, and the WSC executes method steps to define the presentation and position of information associated with the window, and the DWS device executes the steps required for display of the window information.

It is a principal object of the present invention to provide a method and apparatus for enabling users of DWS terminals to obtain the benefits of windowing when connected to a host processor executing applications programs.

It is a further object of the present invention to provide a method and apparatus for utilizing windows in DWS terminals according to the common user access rules defined for user interactivity.

It is another object of the present invention to distribute the processing load associated with the performance of windowing activities, so as to maximize the efficiency of the entire processing system and the user.

BRIEF DESCRIPTION OF THE DRAWINGS

The foregoing and other objects and advantages of the invention will become apparent from the following specification, and with reference to the claims and the appended drawings, in which:

FIG. 10A shows a representative display panel;

FIG. 10B shows the display panel of FIG. 9A with a representative window.

DESCRIPTION OF THE PREFERRED EMBODIMENT

Programmable Workstation

Figure 1:
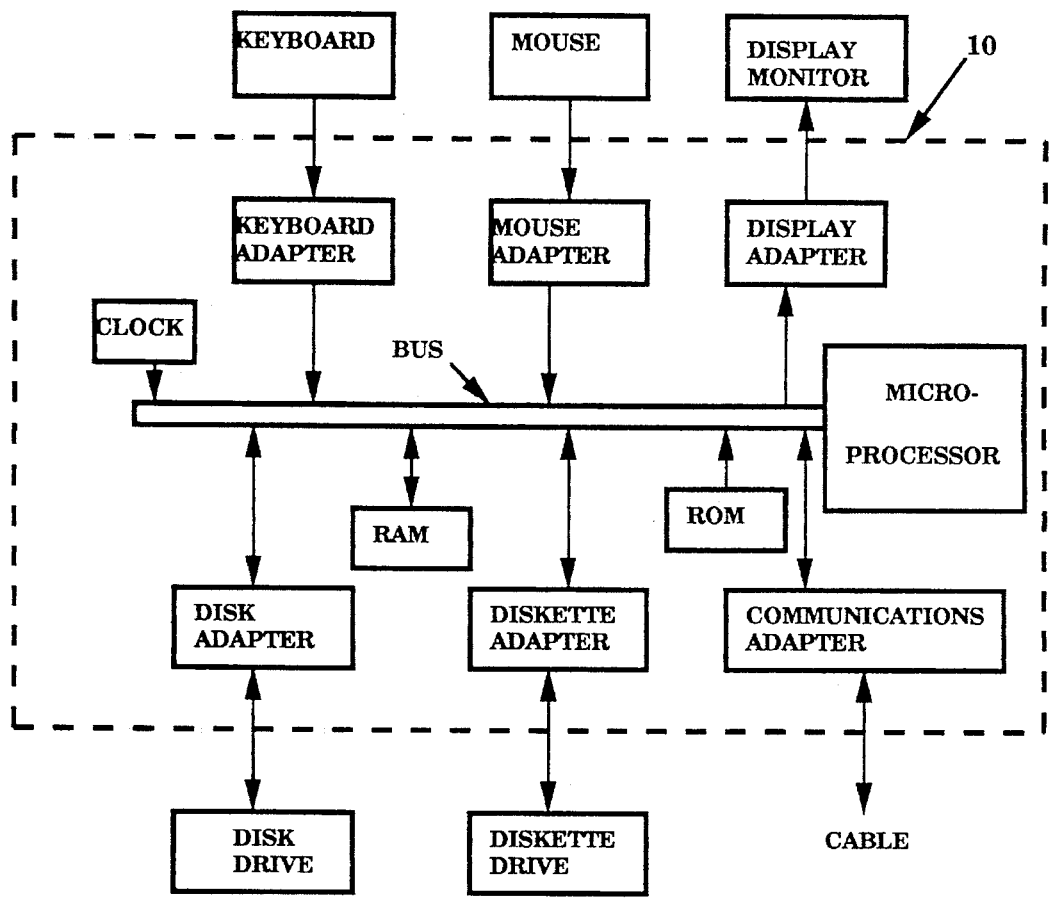
FIG. 1 shows a typical block diagram of a PWS.

Referring first to FIG. 1, there is shown a typical block diagram of a PWS; the circuits within the dotted outline 10 are generally found on one or more circuit boards within the PWS framework. The microprocessor is typically an Intel type 80286 or 80386, or equivalent microprocessors by other manufacturers. The microprocessor has an external bus which may communicate with a number of adapters which themselves are connectable to various internal and external devices. The typical PWS will have a keyboard, and optionally a mouse, connected through adapters to the internal bus, a display monitor connected through an adapter to the internal bus, one or more disk or diskette adapters coupled to one or more disk or diskette drives and connected to the internal bus, and a communications adapter which is connectable to other systems via external cables. The RAM is typically a random access memory having 1–16 megabyte capacity, which is sufficiently large to store a complete operating system, an extensive work area for programmable calculations, a monitor screen buffer area and an area for executing application programs. The ROM is a read only memory which typically contains coding for initializing the machine, for performing diagnostic operations, and for controlling the basic I/O system; the ROM is typically 64–128 kilobytes in capacity. The PWS is therefore operable as a stand-alone computer system, or as an independent workstation which may be connected to a host computer via external cables. The capabilities of the PWS enable it to provide a wide variety of user enhancements, including a full range of cursor controls, instantaneous scrolling, and display screen modification. All of these enhancements are contained and controlled within the PWS itself, although when a PWS is connected to a host computer processor and is operated as a workstation, it receives its overall command and control from the host processor. For example, the host processor may transmit a data stream embodying display screen content to the PWS, and may identify the formats by which the data is to be displayed and controlled, but once the PWS receives the broad directions from the host processor the PWS itself generates the internal control signals for regulating the actual data display on the display monitor. In the preferred embodiment, the PWS shown in FIG. 1 is an IBM Personal System/2 or equivalent, although another IBM personal computer, or equivalent design, could be used.

Dependent Workstation

Figure 2:
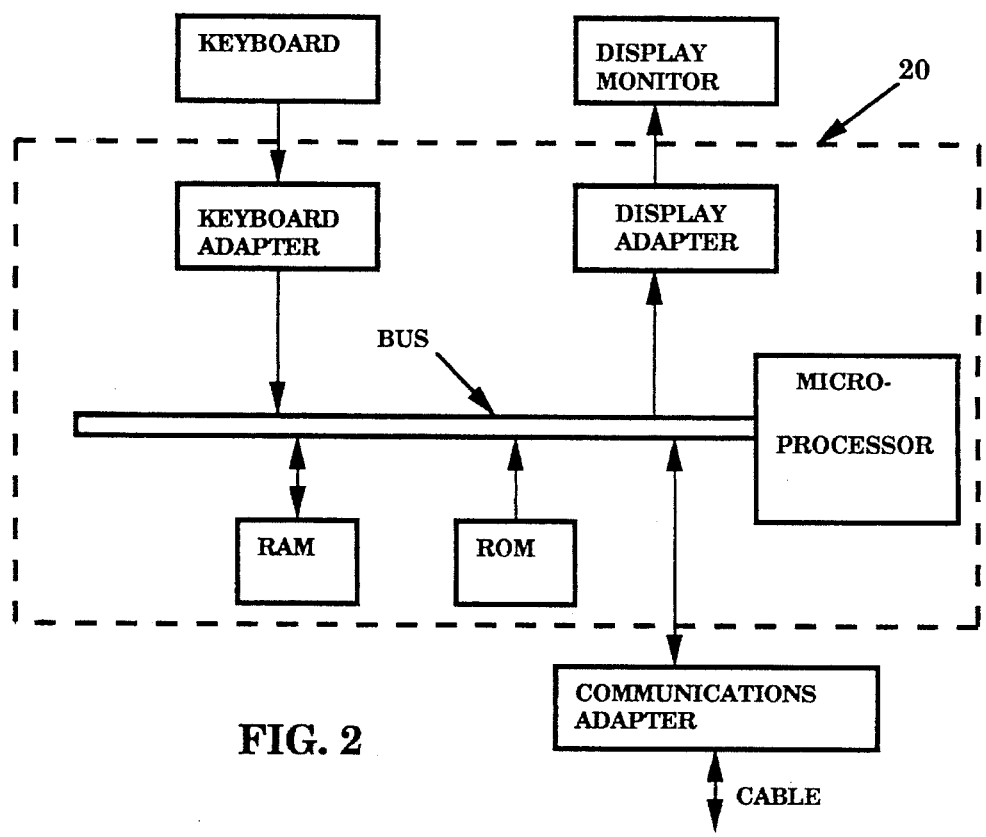
FIG. 2 shows a typical block diagram of a DWS.

FIG. 2 shows a typical block diagram of a DWS, wherein the circuits typically found within the framework are designated within dotted outline 20. The microprocessor is typically an Intel type 8088 or 8086 circuit device, or equivalent, and the microprocessor has an external bus which is connectable to several adapters for enabling communications with a limited number of external devices. For example, a keyboard adapter enables communications between the microprocessor and a keyboard, a display adapter enables information to be transferred to a display monitor, and a "communications" adapter enables communications to be made between the DWS and a host controller. The RAM is typically capable of 3–5 kilobytes of storage, for storing a screen buffer, and for providing a limited amount of memory work area for internal processing. The ROM is typically about 8 kilobytes in capacity, for storing coding relating to power-on processing, diagnostics, and character generation patterns and process communication protocols for communicating with other systems. The DWS is incapable of any significant internal processing beyond that which is required to interface with the keyboard and display monitor, and to communicate via the communications adapter. Therefore, all of the information displayed on the display monitor must be provided via the communications adapter to the RAM, and the microprocessor will generate sufficient internal control to display the information on the display monitor. Similarly, all keystrokes from the keyboard are temporarily received in the RAM, subject to activation of the communications adapter for transmission of the keystroke information over the cable to the WSC. In the preferred embodiment, the DWS shown in FIG. 2 is an IBM 5250 family display, although other equivalent types of DWS could be used.

Workstation Controller

In typical systems, the function of a "workstation controller" is to provide information transfer and control to a plurality of remote terminals from a single host processor. This function is usually performed by a hardware and software package which is uniquely identified and separate from the host processor hardware and software packages. The hardware for a workstation controller is typically contained on a circuit board package or packages which is pluggable into a host processor card slot, and the software for a workstation controller is typically executed by the hardware independently of software which is executed by the host processor. However, in certain systems, the function of a "workstation controller" is entirely a software package function, the software being executed within the host processor hardware. Although the preferred embodiment of the present invention is disclosed with respect to the workstation controller concept which is physically separate from the host processor in both hardware and software details, the invention is applicable to the second type of workstation controller, wherein the functions are performed entirely by a software package residing in a host processor.

Figure 3:
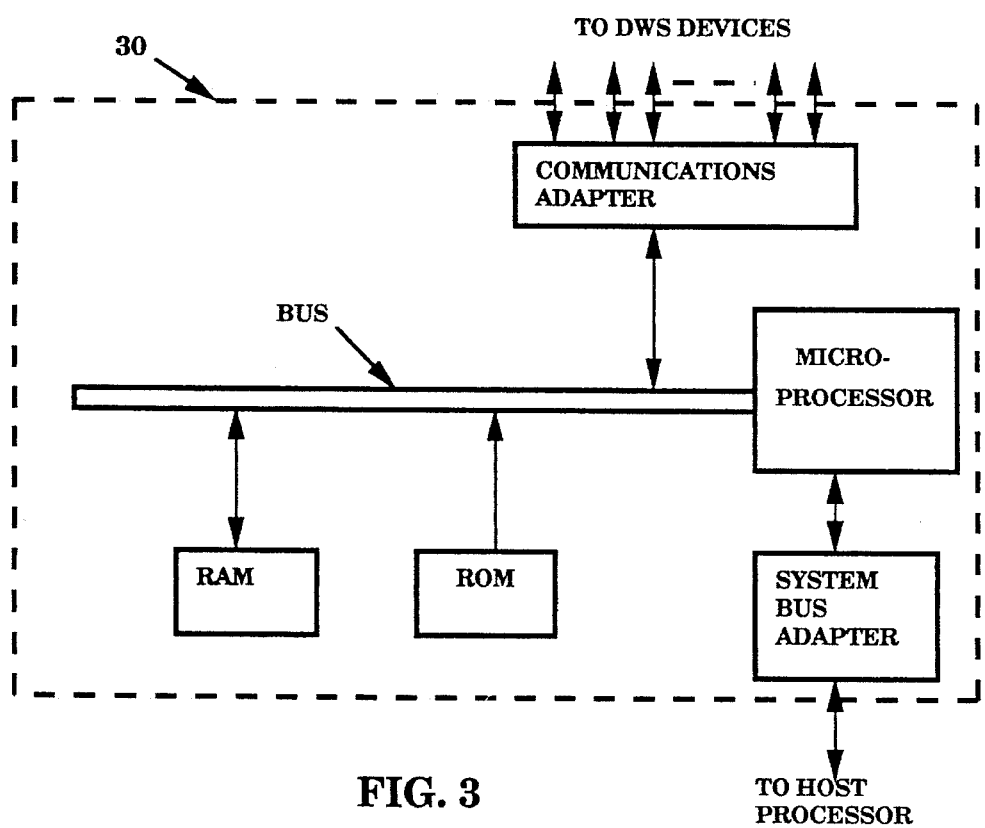
FIG. 3 shows a typical block diagram of a workstation controller.
Figure 7:
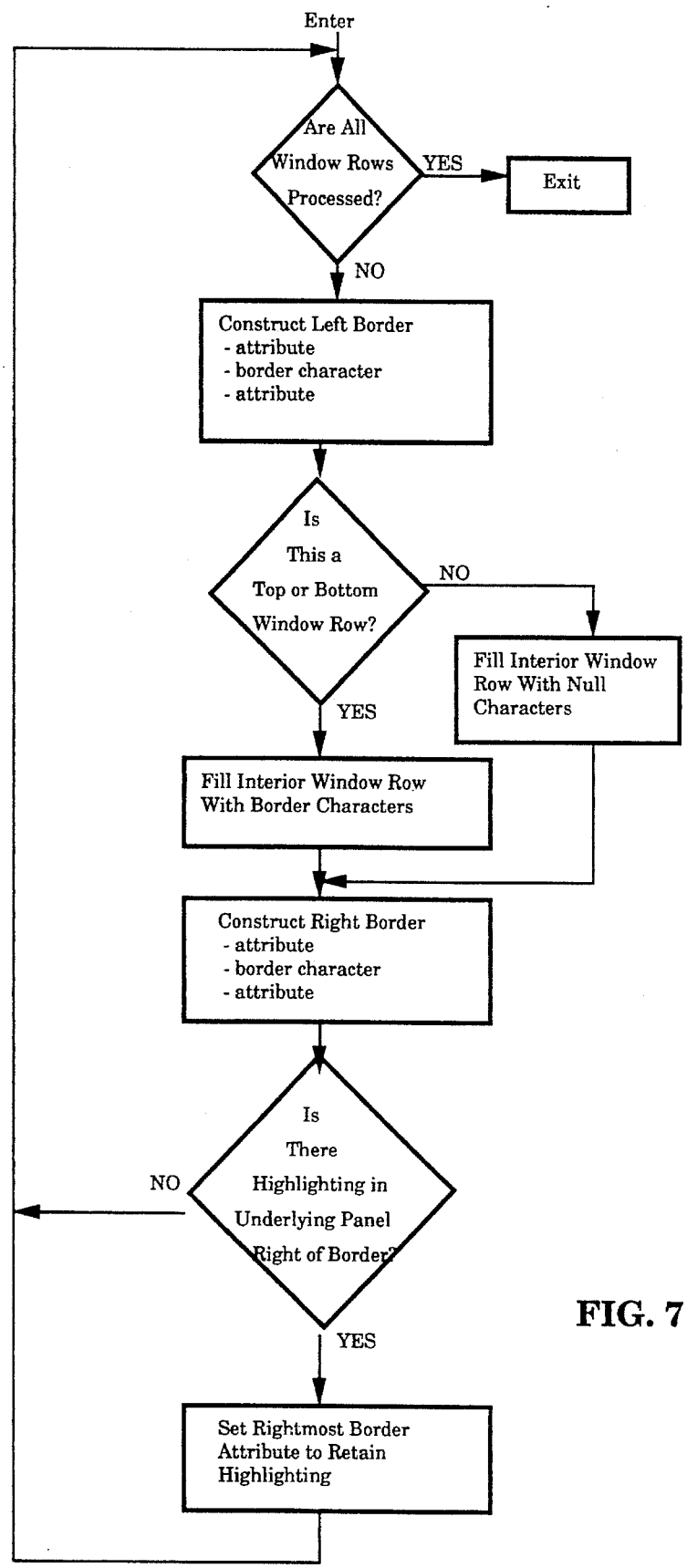
FIG. 7 shows a flow chart for constructing a "window"

FIG. 3 shows a typical block diagram of a workstation controller, of the type which typically communicates with a plurality of DWS devices. The workstation controller has a number of circuits contained within a package designated by dotted outline 30, and a microprocessor which is typically an Intel type 80826 circuit chip, or equivalent. The WSC microprocessor is typically connected to a system bus adapter which itself may communicate with a host computer processor. The WSC also has an internal data bus and a RAM having a capacity of 0.5–2.0 megabytes, and a ROM having a capacity of about 16 kilobytes, containing coding for initializing the WSC and for diagnostics relating to the WSC. The internal data bus of the WSC is connected to a communications adapter, which is externally connected to a "fan-out" multiplexer for enabling a plurality of DWS devices to communicate with a single WSC. In a typical application, the fan-out circuits are connectable to up to 40 DWS devices, and the screen display information for each of these DWS devices is stored within the WSC RAM memory. Likewise, keystroke signals from all of the DWS devices are received by the WSC and stored within the RAM, for subsequent communication to the host processor or for internal processing by the WSC. In the preferred embodiment the WSC of FIG. 3 is a "feature card" for an AS/400 computer system, wherein the microprocessor is suitably programmed as shown in FIG. 7.

Figure 4:
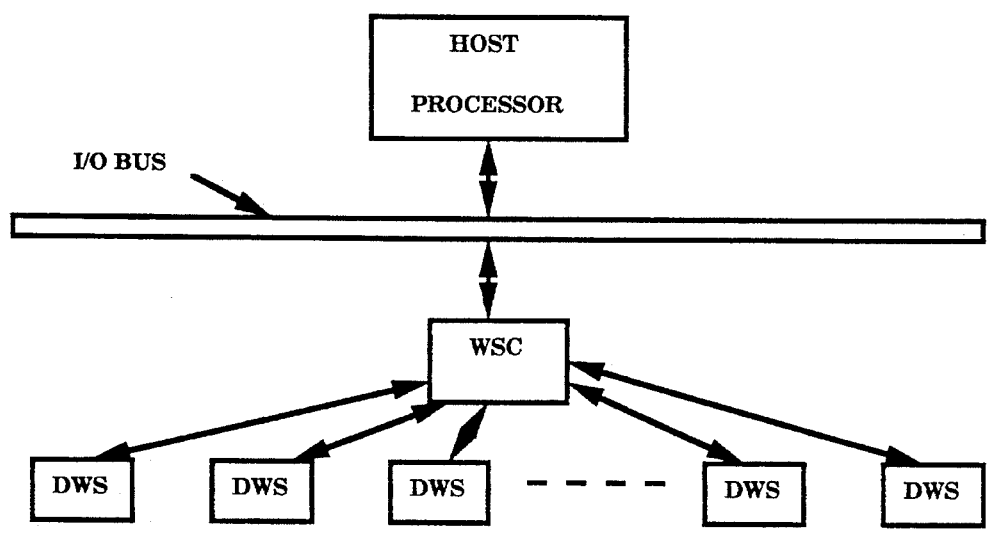
FIG. 4 shows a typical block diagram of a plurality of DWS devices connected to a host computer via a WSC.

FIG. 4 shows a typical block diagram of the system interconnections, wherein the host processor communicates with a WSC via an I/O bus, and a WSC communicates with up to 40 DWS devices via communications cables. Other devices and controllers may be connected to the I/O bus for communication with the host processor. In the preferred embodiment, the host processor is part of an AS/400 computer system.

Under typical operating conditions in the prior art, the host processor will construct a screen display for each of the terminals to which it is connected, the host processor will then transfer the data representative of each screen display to the WSC, where it is retained within a section of RAM identifiable with each particular DWS. The WSC then transfers the screen display data to each of the DWS devices, and each DWS device contains sufficient internal storage to retain the screen display data for purposes of presenting the display image to the user. Included in the display image data may be information relating to the position of a window, although the WSC has no particular knowledge of the window and merely treats it as a part of the display image. The WSC transmits this information to the DWS, including the appearance and location of the window on the screen. If a DWS user makes a keystroke, the DWS indicates that the DWS has keystroke data available for transfer to the host processor. The WSC makes the transfer of this keystroke data when polling the DWS. The WSC retains in its internal memory and control information relating to all of the screen display images with which it is dealing, and information relating to all of the window position information for the various DWS devices it is interacting with. It transmits to and receives this information from the host processor upon command.

Figure 5:
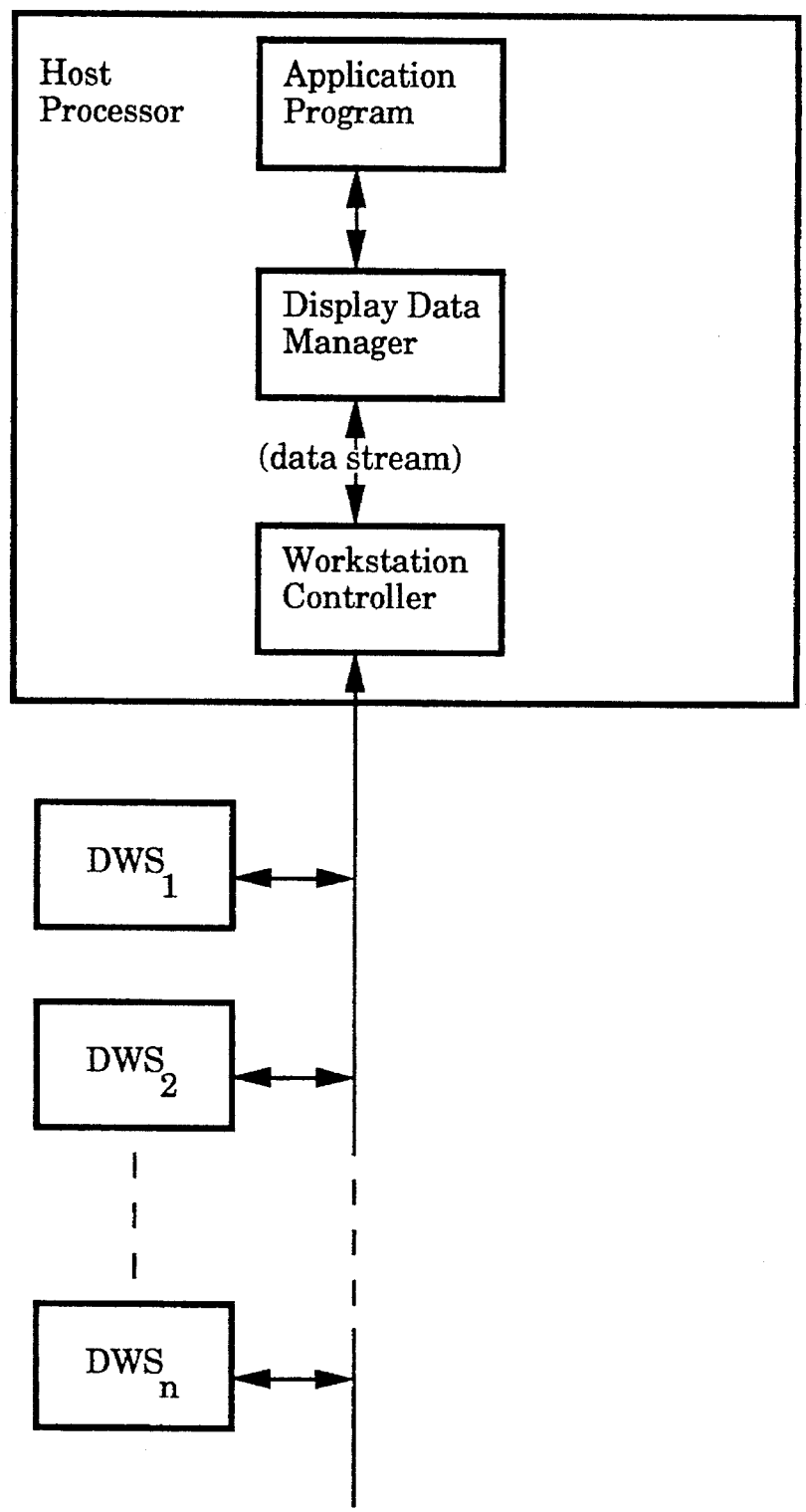
FIG. 5 shows a simplified diagram illustrating display data flow in, system having DWS terminals.

FIG. 5 shows a simplified diagram to illustrate the display data flow in a system having DWS terminals. The host processor executes application programs as a part of its normal operating function. These application programs communicate, from time to time, with the remote terminals connected in the system, either by processing keyboard data sent from the terminals or by generating display information to be transmitted to the terminals for display. When an applications program needs to communicate with a remote terminal it calls up an applications program interface routine, one form of which is identified as a "display data manager." When information is to be displayed at a remote terminal, the display data manager constructs a data stream according to a particular format, and transmits this data stream to a workstation controller. The workstation controller selectively interacts with all of the DWS devices, selectively activating the appropriate device and then passing the information to be displayed onto the selected DWS device.

Figure 6:
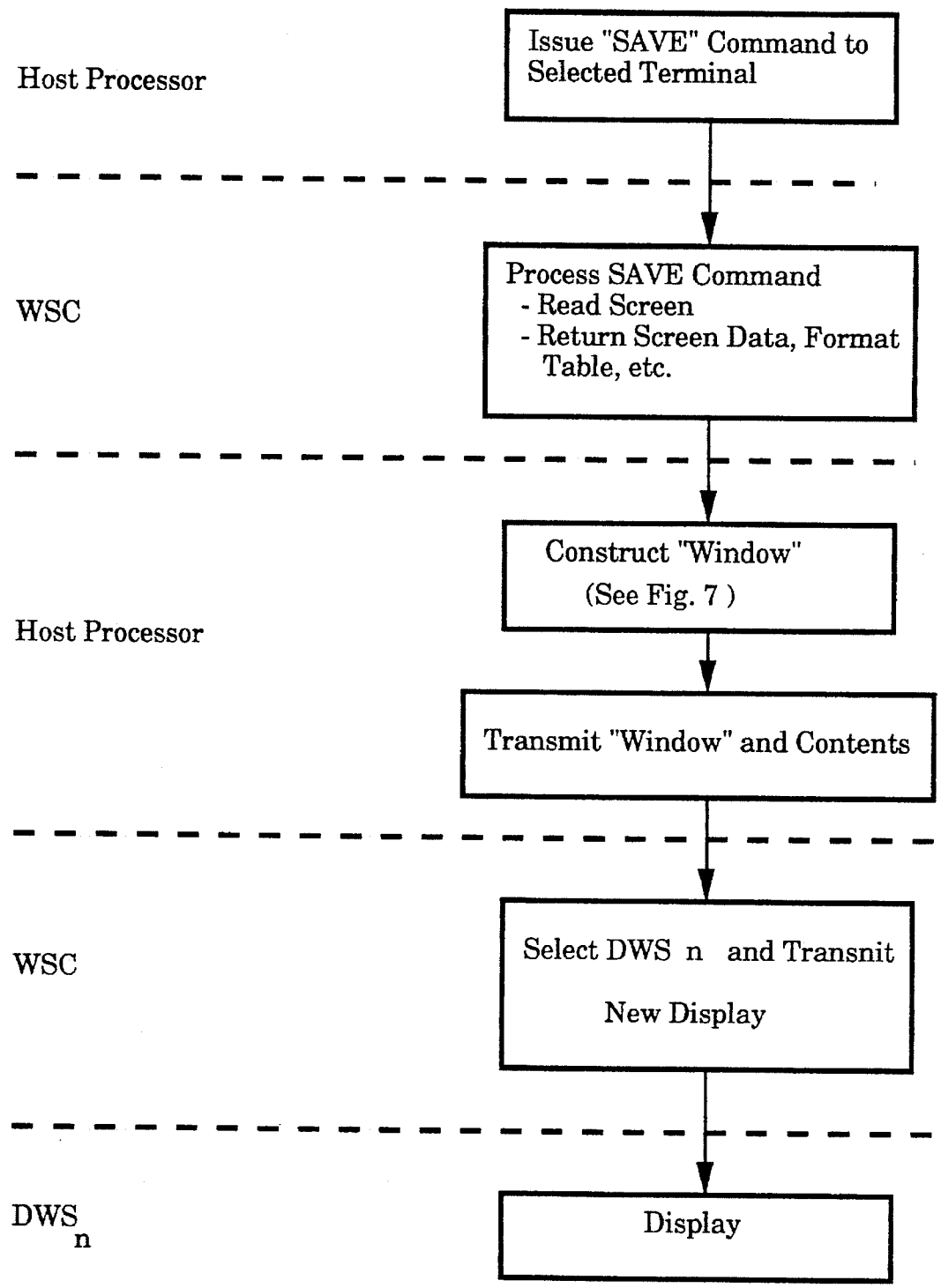
FIG. 6 shows a flow chart of the windowing operation according to the prior art.

FIG. 6 shows a flow chart which illustrates the software and hardware interaction which is necessary to construct "windows" at a remote terminal display screen, according to the teachings of the prior art. The host processor applications software calls up a display data manager program for accomplishing this task. The display data manager software in the host processor first issues a "SAVE" command to the selected remote terminal. This command is transmitted to the WSC, thereby causing the WSC to retrieve the information currently being displayed on the selected terminal screen, and to transmit this information, the format table information, and certain station state information associated with the selected terminal to the host processor. The retrieval and transmission of this information involves about 3,000 bytes, which typically takes about 2.5 seconds to accomplish over a typical 9600 baud communications line, which is in addition to the 1–2 seconds required for the execution of the "SAVE" command itself. After the host processor receives this returned information, it executes a software routine (FIG. 7) to construct a window for the selected terminal. The window position information and contents are then transmitted to the WSC, which takes another 1–2 seconds of time, and it selects the appropriate terminal and transmits a new display screen to the device. The terminal receives this new information and presents a new display incorporating the window as an overlay over its previous display, The process of removing a window from a display screen essentially follows the same procedure as is illustrated in FIG. 6, although in this case the host processor issues a "RESTORE" command to restore the screen image, format table and station state table information associated with the previous panel displayed on the selected terminal screen.

This command is transmitted to the WSC for processing, which results in the WSC transmitting a new display panel for display on the terminal screen.

FIG. 7 shows a flow chart illustrating the steps for constructing a window. In the prior art, the software required to execute the steps shown in the flow chart is contained within the host processor. The software constructs borders consisting of selective border characters, to surround the periphery of the window, and also generates null characters to clear out the display within the interior of the window. For each row, a border segment is constructed by developing a border character bounded on either side by a display attribute. Since the window is intended to overlay the panel previously displayed, the portion of the underlying panel must be examined to determine whether any pre-existing highlighting was shown, and if pre-existing highlighting was shown outside of the window area, the rightmost border attributes of the window must be adjusted to retain the highlighting. The software flow chart illustrated in FIG. 7 is executed for each row of the window, wherein the top and bottom window rows are appropriately filled with horizontal border characters.

Figure 8:
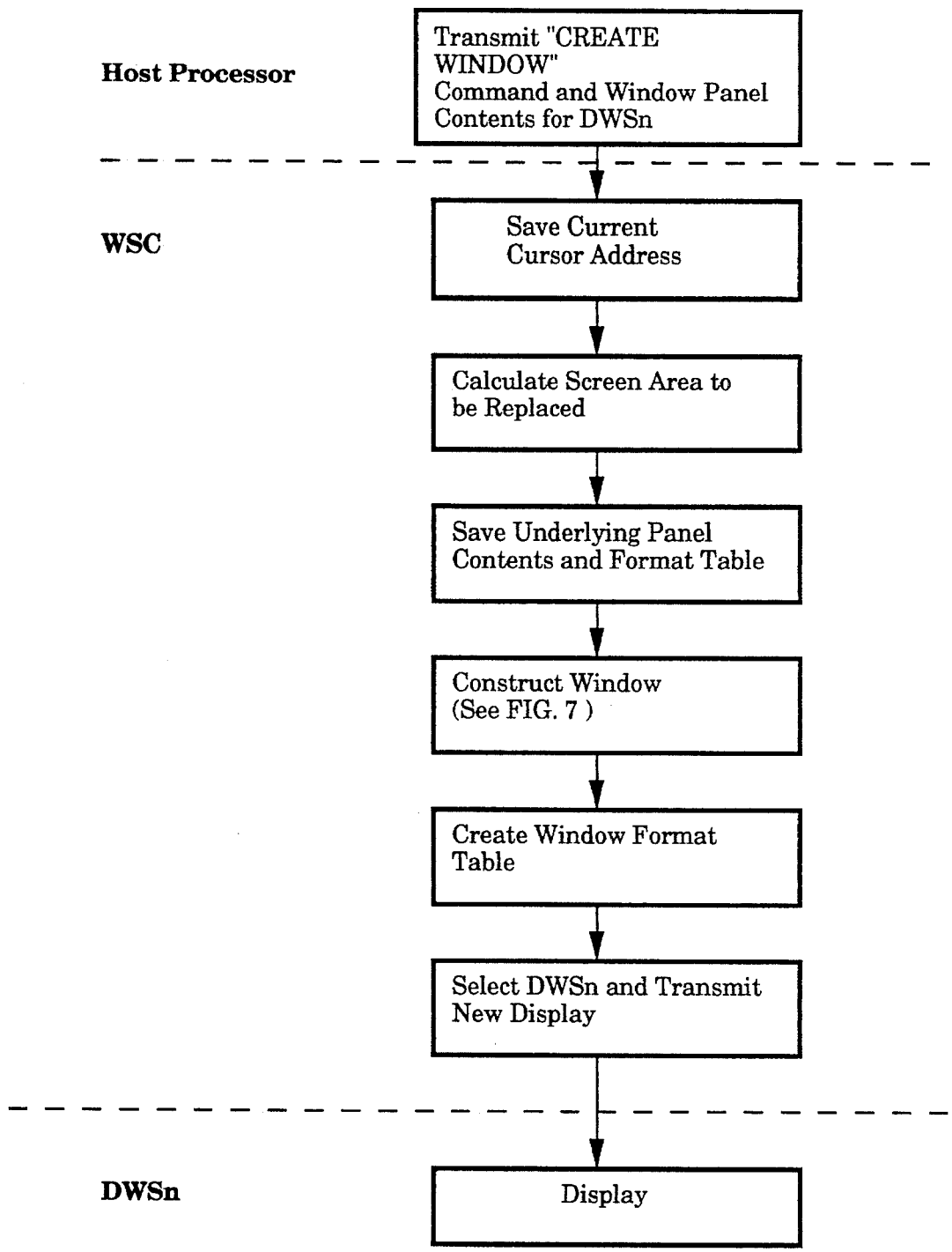
FIG. 8A shows a flow chart of the present invention for creating a window in a DWS.
FIG. 8B shows a flow chart of the present invention for creating a window in a PWS.

FIG. 8A shows a flow chart of the present invention feature for creating a window, illustrating the hardware and software interchange required for constructing and displaying windows on selected DWS devices. The display data manager software in the host processor transmits a "CREATE WINDOW" command, and transmits the desired window panel contents to the WSC. The "CREATE WINDOW" command contains the position of the window, such as upper left corner, and the area of the window, such as the number of rows and columns. The position and area of the window together define the parmeters of the window. This transmission takes the form of a 5250 data stream, containing the "CREATE WINDOW" command. This data stream is received by the WSC and is processed by the software operating within the WSC. The WSC software identifies the particular DWS device which is to be affected by the data stream command, and the remaining steps shown in FIG. 8A are specifically directed to the selected DWS device. The WSC software controls and monitors the status of all DWS devices to which it is connected, so it can readily perform the device-specific processing steps. For example, the WSC maintains a record of the current cursor addresses for each of the DWS devices which it controls. For the selected device, the WSC retrieves and saves this current cursor address, so that it may be restored after the window has been removed. The WSC interprets the data stream received from the host processor, and makes a calculation of the screen area on the selected DWS which is to be replaced by the window. The WSC retrieves and stores the panel contents which lie within the calculated window area, for a subsequent replacement in the panel after the window has been removed. The WSC then constructs the window according to the steps illustrated in FIG. 7, it being presumed that the microprocessor shown in the WSC of FIG. 2 is suitably programmed to carry out the steps of FIG. 7. The WSC then creates a window format table which it stores in a memory area associated with the particular selected DWS device. The WSC then selects the DWS device and transmits the new display, which will include the newly-constructed window overlaid over the underlying and previous panel contents. The DWS device displays this new screen, and the WSC restricts cursor movement to within the window.

Figure 8B:
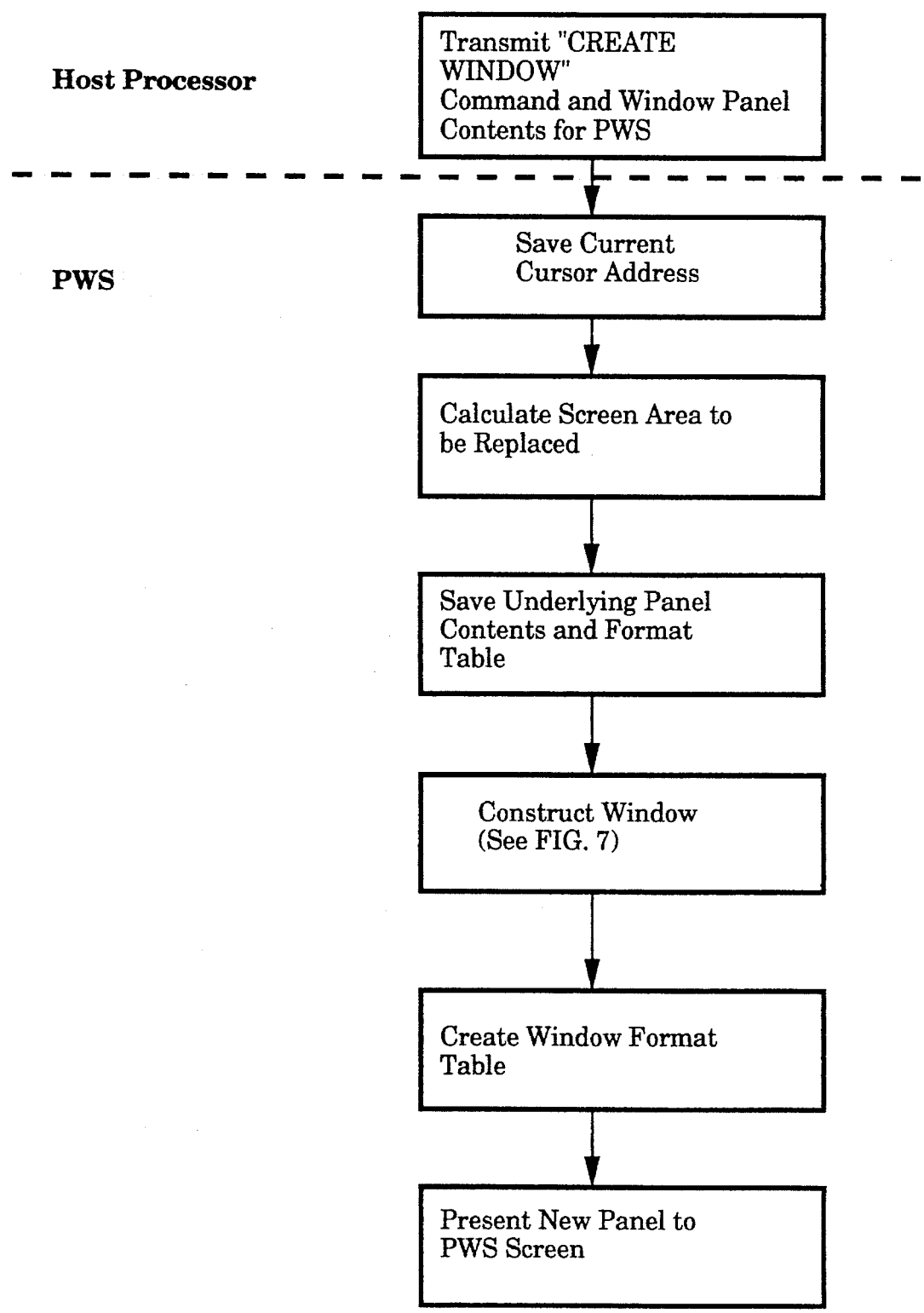

FIG. 8B shows a flow chart of the present invention feature for creating a window on a selected PWS device. In this case, the display data manager software in the host processor transmits a "CREATE WINDOW" command and transmits the desired window panel contents to the PWS. This transmission is in all respects identical to the 5250 data stream previously described with reference to the WSC device. In other words, the host processor constructs a 5250 data stream irrespective of the type and identity of the receiving device. This is an important feature of the invention, for the host processor software may be written without knowledge or consideration of the types of devices which will ultimately be connected to the host processor, either as local or remote terminals. The data stream is received by the PWS and is processed in much the same manner as previously described. The current cursor address is retrieved and saved, for subsequent restoration after the window has been removed. The screen area which is to be covered by the window is calculated, and the panel contents underlying the calculated screen area are saved for subsequent replacement. The window is constructed by the PWS software, it being presumed that the microprocessor illustrated in FIG. 2 has been suitably programmed to perform the steps of FIG. 7. The PWS creates a window format table, and presents the new panel display to the PWS screen. The panel is displayed on the screen, thereby completing the process steps.

Figure 9:
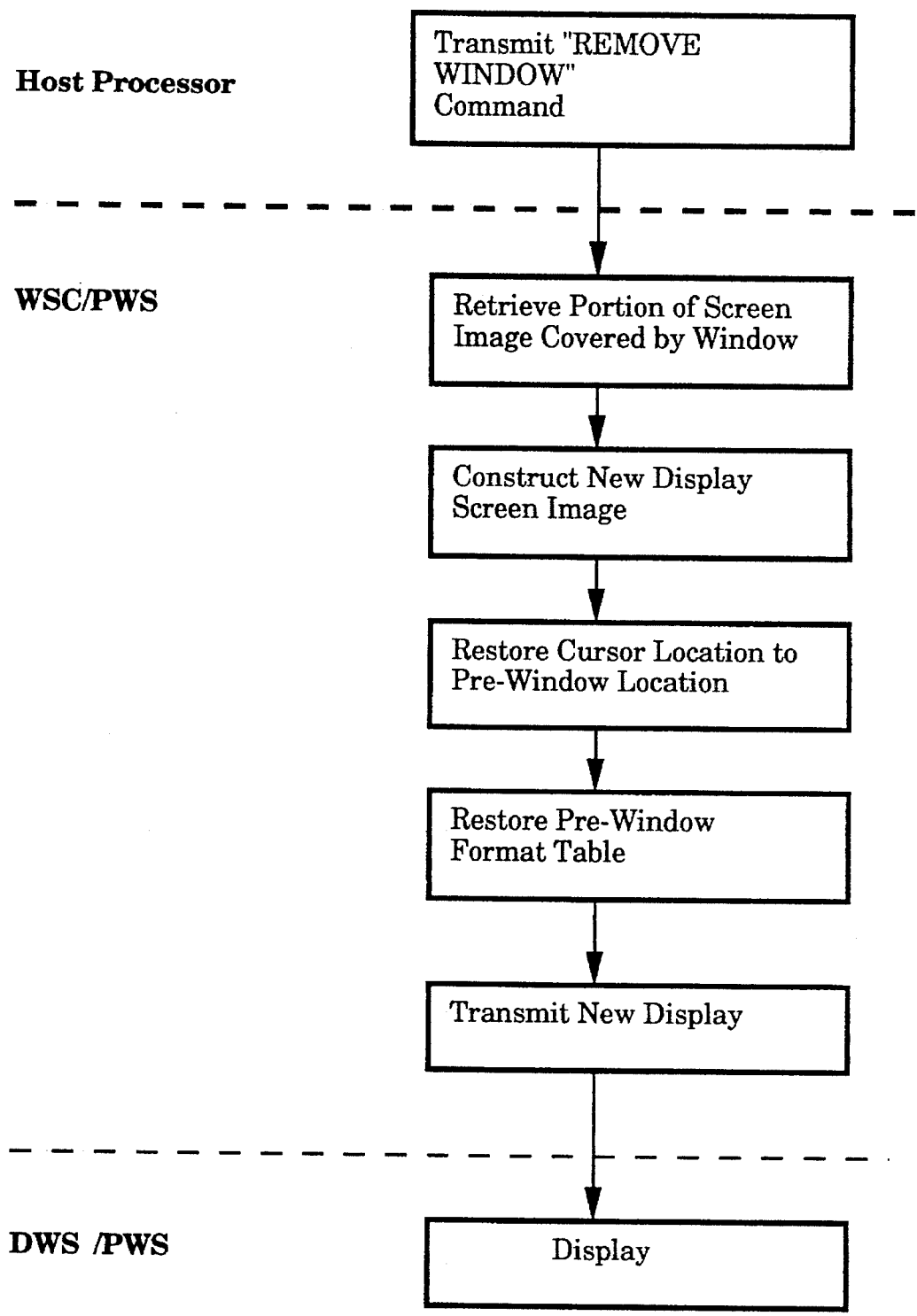
FIG. 9 shows a flow chart of the present invention for removing a window.

FIG. 9 shows a flow chart of the present invention feature for removing a window, illustrating the hardware and software interchange required for this process. The host processor transmits a "REMOVE WINDOW" command to the WSC. The WSC then retrieves the portion of the previous screen image which was covered by the window, from its own internal memory. The WSC constructs a new display screen image, comprising the "pre-window" display screen image, and restores the cursor location to the pre-window location, and restores the pre-window format table associated with the previous screen image. The WSC then transmits a new display to the DWS, the DWS receives the display and presents it to the user on the display screen. The "REMOVE WINDOW" command is processed in a PWS in much the same way as is shown in FIG. 9 with respect to a WSC/DWS processing. In either case, the host processor generates a 5250 data stream containing the "REMOVE WINDOW" command, and the data stream is received by whatever type of device is connected. In the case of the PWS, all of the processing takes place within the PWS device itself, because the PWS interacts with its own display screen.

By way of example, FIG. 10A shows a typical display panel, of the type which might be constructed and utilized by an application program. The panel contains three input fields, the first field (report type) and the last field (budget accounts) being selection fields. The middle field (fiscal period) is an entry field, and a "pop-up window" is associated with this field. The pop-up window will contain a list of valid choices which might be made for entry into the field. The user can invoke the pop-up window associated with this field by pressing the "F4" key; when the user depresses this key a representative signal is sent to the WSC, and then to the host processor, to initiate the processing transactions previously described. FIG. 10B shows the display panels after the pop-up window has been presented on the screen. The user can select the desired choice shown in the pop-up window, according to CUA rules, and when he depresses "ENTER" the choice is selected. The pop-up window is then removed according to the processes described herein.

The present invention provides significant performance improvements by generating and removing windows through processor operations performed in the WSC. For example, the underlying panel data does not need to be transmitted from the DWS to the host processor when a window is generated; this data is saved in the WSC local storage area, which significantly reduces communications time required for supporting remote workstations. Further, window positioning, border generation, and panel formatting are processed in the WSC, thereby off-loading work from the host processor. Finally, underlying panel data does not need to be transmitted from the host processor to the DWS when a window is removed, which also significantly reduces communications time required to support remote workstations. If a WSC becomes overloaded to the point where operating performance is less than desired, one or more additional WSC's can be added to the system.

Further advantages are provided by distributing these processing steps into the WSC, for the host processor no longer needs to have knowledge of device-specific capabilities. For example, the host processor does not need to have special knowledge concerning the capabilities of any particular DWS device, for the WSC can present panel enhancements such as windowing using the best capabilities available on each device. Since the invention removes certain dependencies between the host processor and the DWS devices, it is simpler to develop new software and capabilities, because dependencies do not have to be as closely considered as in the past. Support programs for DWS devices can be developed in conjunction with WSC considerations, rather than having to take into account unique interrelationships between the DWS devices and the host processor.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A method for assisting in generating and removing windows at a plurality of remote terminal display screens, each display screen having preexisting display screen contents, connected via a workstation controller to a host processor, comprising the steps of:

a) in the host processor, creating a data stream containing position, area and contents of a window, and containing the identity of one of said plurality of remote terminal display screens for receiving said window;

b) transmitting the data stream from the host processor to the workstation controller;

c) in the workstation controller, identifying said one of said plurality of remote terminal display screens for receiving said window and saving the preexisting display screen contents of said one of said plurality of remote terminal display screens for receiving said window;

d) in the workstation controller, constructing the window and its borders as an overlay over the preexisting display screen contents;

e) transmitting the constructed window overlay from the workstation controller to said one of said plurality of remote terminal display screens for receiving said window; and f) in said one of said plurality of remote terminal display screens for receiving said window, displaying the overlay and the preexisting display screen contents.

2. The method of claim 1, further comprising the steps of:

g) in the host processor, generating a command to remove a window at a designated remote terminal destination;

h) transmitting said command from the host processor to the workstation controller;

i) in the workstation controller, retrieving the preexisting display screen contents previously overlaid by said window;

j) transmitting the retrieved preexisting display screen contents from the workstation controller to the designated remote terminal; and k) in the designated remote terminal, displaying the retrieved and transmitted preexisting display screen contents.

3. A method for assisting in generating windows in a designated one of a plurality of terminals connected to a workstation controller in response to a data stream from a host processor, to said workstation controller, wherein said data stream identifies a designated terminal and window positioned contents, comprising the steps performed in the workstation controller of: p1 a) saving a current cursor address for said designated terminal;

b) calculating a screen area to be replaced by said window;

c) constructing a display image of said window;

d) selecting said designated terminal; and e) transmitting said display image to said designated terminal.

4. The method of claim 3, further comprising the steps performed in said workstation controller, of:

f) restricting a range of permissible cursor addresses to cursor addresses which are located within said window.

5. A method for assisting in removing windows in a designated one of a plurality of terminals connected to a workstation controller in response to a data stream from a host processor to said workstation controller, wherein said data stream identifies a designated terminal and designates the removal of a window displayed at said designated terminal, comprising the steps performed in the workstation controller of:

a) retrieving from memory a portion of a screen display overlaid by said window;

b) constructing a new display screen image including the portion;

c) selecting said designated terminal; and d) transmitting said new display screen image to said designated terminal.

6. An apparatus for assisting in generating and removing windows at one of a plurality of remote terminal display screens, wherein the plurality of remote terminal display screens are connected via controllers to a host processor, comprising:

a) host processor means for generating a data stream, said data stream defining parameters and contents of a window;

b) means for transmitting said data stream to a controller;

c) means, in said controller, for receiving said data stream and constructing a display screen panel incorporating said window; and d) a display apparatus connected to said controller, said display apparatus having means for displaying a display panel image incorporating said window.

7. The apparatus of claim 6, wherein said controllers further comprise a workstation controller having means for connection to one or more dependent workstations.

8. The apparatus of claim 6, wherein said controllers further comprise a programmable workstation.

9. The apparatus of claim 6, wherein said controllers further comprise at least one programmable workstation and at least one workstation controller having means for connection to a plurality of nonprogrammable terminals.

* * * * *